US00RE34750E

United States Patent [19]

Ohmori

[11] E Patent Number: Re. 34,750

[45] Reissued Date of Patent: Oct. 4, 1994

[54] LASER PRINTING SYSTEM

[75] Inventor: Naoto Ohmori, Osaka, Japan

[73] Assignee: Minolta Camera Kabushiki Kaisha, Osaka, Japan

[21] Appl. No.: 699,461

[22] Filed: May 13, 1991

Related U.S. Patent Documents

Reissue of:

[64] Patent No.: 4,847,643
Issued: Jul. 11, 1989
Appl. No.: 155,532
Filed: Feb. 12, 1988

[30] Foreign Application Priority Data

Feb. 19, 1987 [JP] Japan ..... 62-37618
Oct. 17, 1987 [JP] Japan ..... 62-262460
Oct. 17, 1987 [JP] Japan ..... 62-262461

[51] Int. Cl.[5] ..... G01D 15/14; G03G 15/01
[52] U.S. Cl. ..... 346/160; 346/157
[58] Field of Search ..... 346/153.1-160

[56] References Cited

U.S. PATENT DOCUMENTS 4,230,902 10/1980 Hug et al. ..... 346/160
4,538,895 9/1985 Higgins et al. ..... 346/160
4,560,999 12/1985 Tokuhaka ..... 346/160
4,660,961 4/1987 Kuramoto et al. ..... 346/153.1
4,752,801 6/1988 Kando ..... 346/160
4,772,915 9/1988 Kando ..... 346/160

FOREIGN PATENT DOCUMENTS 117372 7/1984 Japan ..... 346/160
198076 11/1984 Japan ..... 346/160
221165 12/1984 Japan ..... 346/160

*Primary Examiner*—George H. Miller, Jr.
*Attorney, Agent, or Firm*—Burns, Doane, Swecker & Mathis

[57] ABSTRACT

A laser printing system including a main body having a photosensitive member and an optical unit for forming an image on the photosensitive member by projecting a laser beam thereon. The optical unit is detachably provided in said main body and has a laser beam source, a laser beam source drive circuit, a laser beam shaping member, and a polygonal mirror for scanning the surface of the photosensitive member with the laser beam. The optical unit gives to the main body an instruction as to the dot density especially assigned thereto. The main body forms the image at the dot density assigned to the optical unit which is selected from a plurality of optical units having different dot densities. Accordingly, the optical units having different dot densities are prepared so as to be selectively used to obtain the desired one of the dot densities.

19 Claims, 6 Drawing Sheets

LASER PRINTING SYSTEM

Matter enclosed in heavy brackets [ ] appears in the original patent but forms no part of this reissue specification; matter printed in italics indicates the additions made by reissue.

FIELD OF THE INVENTION

The present invention relates to a laser printing system for forming images by scanning a photosensitive member with a laser beam for exposure.

BACKGROUND OF THE INVENTION

Electrophotographic printers having a laser as the light source generally include an optical device which comprises the laser light source, laser beam shaping means and a beam scanning assembly. In recent years, such printers have been required to have a dot density (DPI: dots/inch) in the range of 100 to 1000, whereas different dot densities need different optical devices, consequently necessitating different printers.

Accordingly, Unexamined Japanese Patent Application No. SHO 59-117372 proposes a printer which is adapted to selectively give one of a plurality of different dot densities by automatically collectively controlling the laser beam diameter, laser modulation frequency, speed of rotation of a polygonal mirror for scanning with the beam and speed of rotation of the photosensitive drum.

However, since the prior-art printer has a single optical device which has a variable beam diameter, laser modulation frequency and rotational speed of the polygonal mirror, the device is complex in construction and becomes large-sized. Moreover there is a limitation to the speed of the motor in varying the speed of the polygonal mirror, and a higher speed results in impaired durability and a lower speed involves uneven rotation. The use of one optical device thus imposes limitations on the range of dot density variations, so that there arises a need to prepare different printers for widely varying dot densities.

SUMMARY OF THE INVENTION

Accordingly, the primary object of the present invention is to provide a laser printing system having a wider range of dot density variations although the system is of the single printer type.

Another object of the invention is to provide a laser printing system wherein the dot density is variable easily.

Another object of the invention is to provide a laser printing system which is easy to repair when the laser optical device thereof malfunctions and which is also easy to maintain.

Still another object of the invention is to provide a laser printing system which is adapted to produce prints in different colors each at a suitable dot density.

The foregoing objects can be fulfilled by providing a laser printing system comprising:

a main body including a photosensitive member; and an optical unit for forming an image on the photosensitive member by projecting a laser beam thereon, said unit being exchangably provided in said main body and being selected from a plurality of units each having a different dot density, and comprising;

a laser beam source, means for driving the laser beam source, means for shaping the laser beam, means for scanning the surface of said photosensitive member with the laser beam, and means for giving an instruction as to the dot density of said unit to said main body;

wherein said main body forms the image at the dot density according to the instruction corresponding to the selected optical unit.

BRIEF DESCRIPTION OF THE DRAWINGS

These and other objects or features of the present invention will become apparent from the following description of preferred embodiments thereof taken in conjunction with the accompanying drawings, in which.

In the following description, like parts are designated by like reference numbers throughout the several drawings.

DESCRIPTION OF THE PREFERRED EMBODIMENTS

Figure 1:
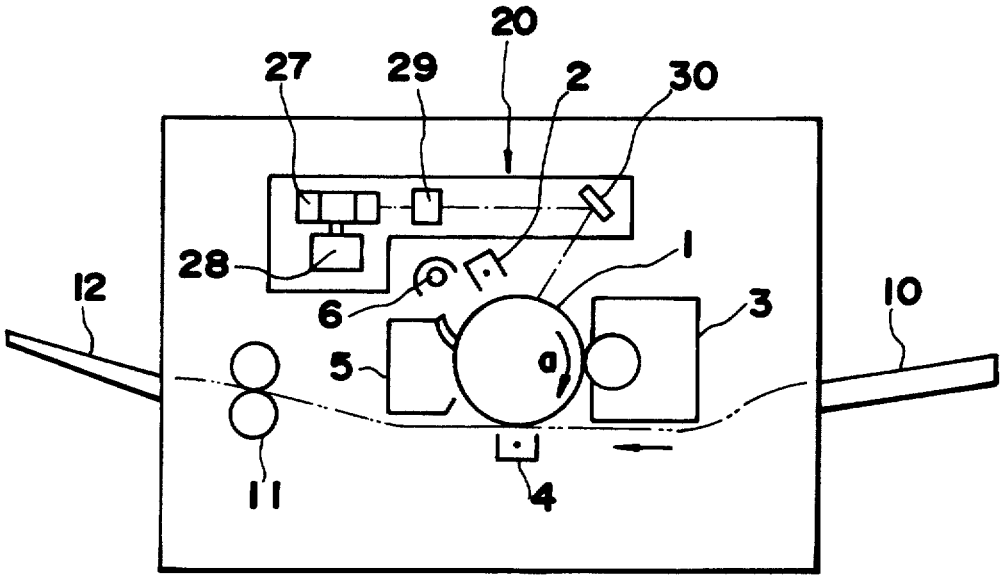
FIGS. 1 and 2 are respectively a diagram and a perspective view schematically showing the construction of a laser printing system according to a first embodiment of the invention.
Figure 2:
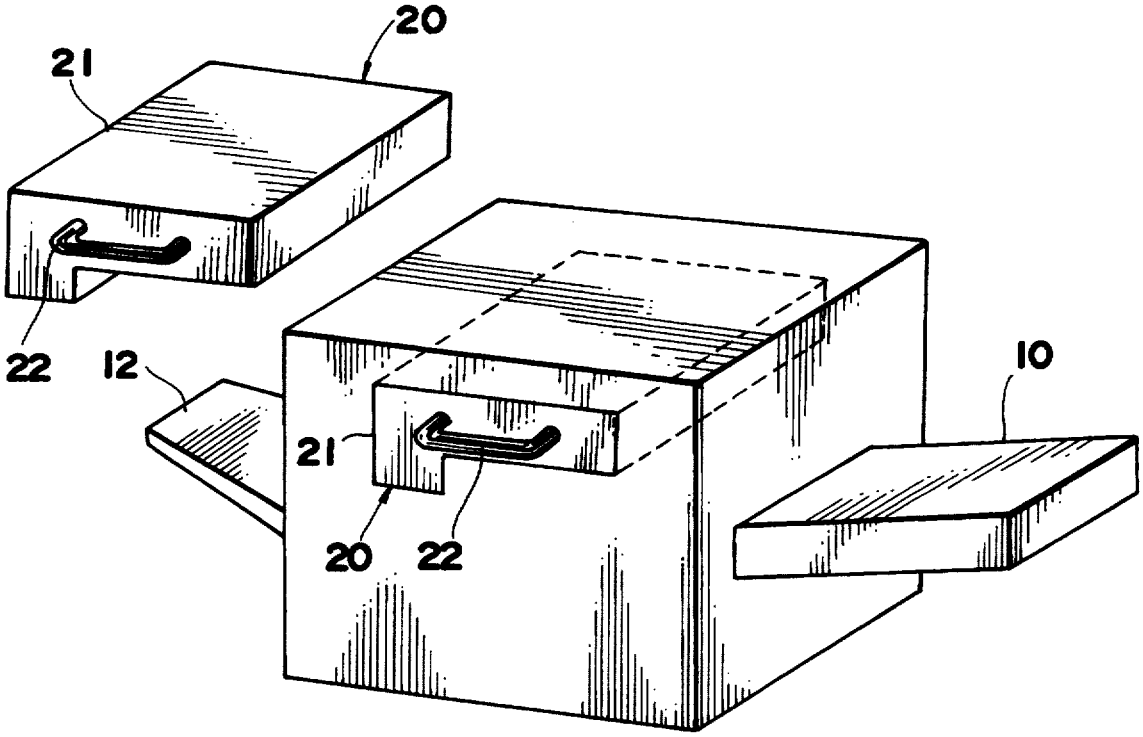
Figure 3:
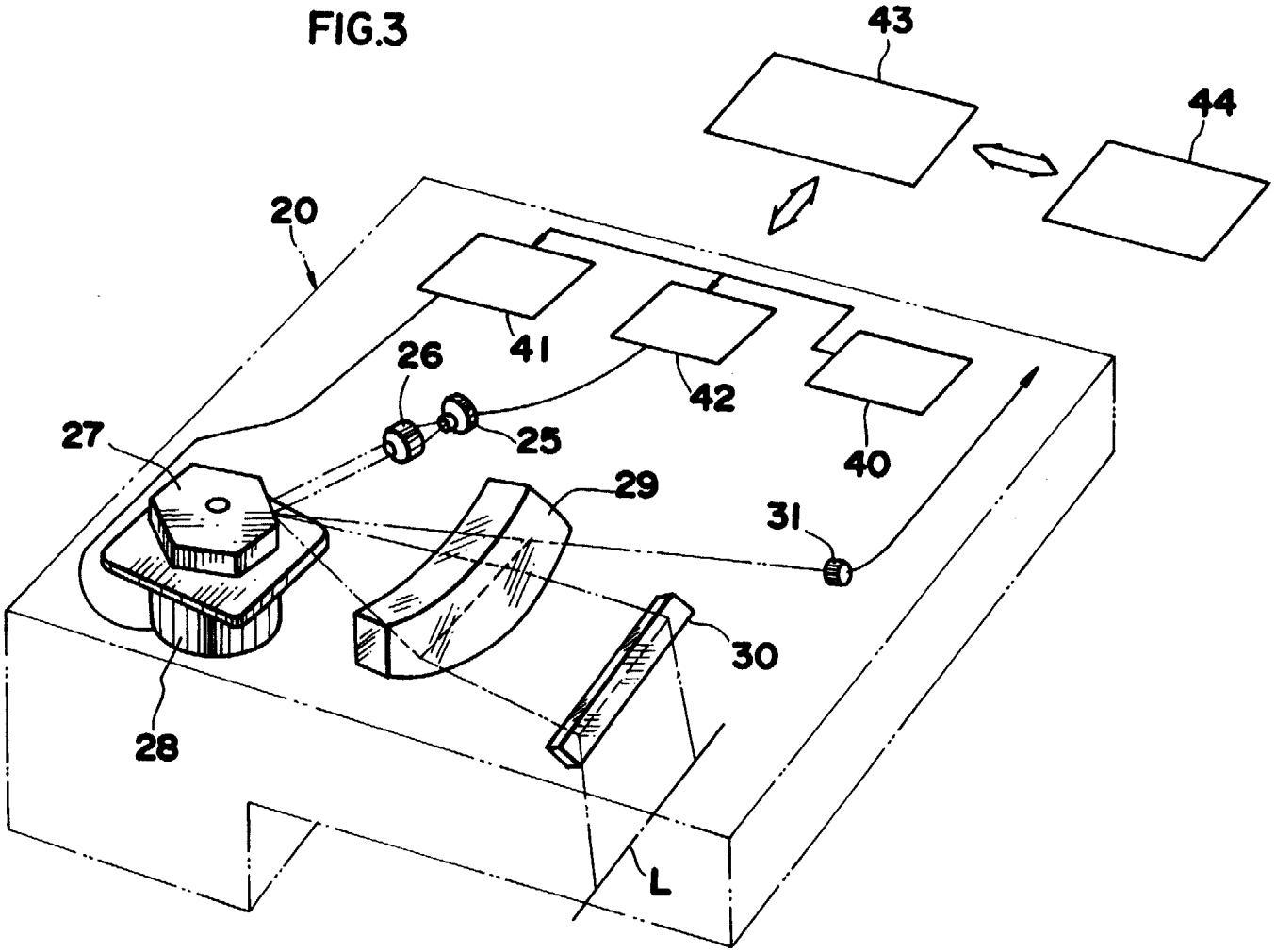
FIG. 3 is a diagram showing the construction of an optical unit included int he first embodiment.

FIGS. 1 and 2 are a diagram and a perspective view schematically showing the construction of the first embodiment, i.e., a laser printing system.

The system per se is adapted for practicing a known electrophotographic process and has a photosensitive drum 1 disposed in its center and drivingly rotatable in the direction of arrow a. Arranged around the drum 1 are a sensitizing charger 2, a magnetic brush developing unit 3, a transfer charger 4, a cleaner 5 of the blade type and an eraser lamp 6. The surface of the drum 1 is first charged to a predetermined potential by the charger 2 and the irradiated with a laser beam from the optical unit 20 to be described below in detail to form an electrostatic latent image on the drum surface. The latent image is converted to a visible image by the deposition of tone by the developing unit 3. By the discharge of the transfer charger 4, the toner image is transferred onto copy paper fed from a paper cassette 10 through a path indicated by a two-dot-and-dash line and is thermally fixed to the paper by a fixing unit 11. The copy paper is thereafter delivered onto a discharge tray 12.

On the other hand, the photosensitive drum 1 continues to rotate in the direction of arrow a after the image transfer, cleaned by the cleaner 5 for the removal of the residual toner, irradiated by the eraser lamp 6 for the removal of the residual charge and made ready for the subsequent copying cycle.

The optical unit 20 is int he form of a cartridge having a case 21 with a handle 22 and can be removably installed in position within the main body of the system from the front side thereof by being guided along unillustrated guide rails or the like.

The optical unit 20 has inside the case 21 a laser diode 25 serving as a light source, a collimator lens 26, a polygonal mirror 27, a drive motor 28 for rotating the mirror, SOS lens 29, reflecting mirror 30 and SOS sensor 31.

The laser beam emitter by the laser diode 25 and spreading out to some extent is collimated by the collimator lens 26, deflected by the polygonal mirror 27 and projected via the $f\theta$ lens 29 and the reflecting mirror 30 onto the drum 1 parallel to the axis thereof, i.e., along the main scanning line L. The SOS sensor 31 has the function of correcting an error in the recording start position in each scan line due to the errors involved in the division of the mirror surface of the polygonal mirror 27. To detect the image start position in the main scanning direction, the sensor is position in equivalent relation to the main scanning line L on the surface of the photosensitive drum 1.

With the above arrangement, the relationship between the dot density and various optical factors is represented by the following equations. It is herein assumed that the dot density in the main scanning direction is identical with that in the subscanning direction.

Beam diameter (d): $d - C_1/D$ (1)

Number of revolutions (R) of the polygonal mirror: $R = C_2.D.V/N$ (2)

Modulation frequency (f): $f = C_3.F.D_2.V/N$ (3)

Amount of light (E): $E = C_4.P_0.N(F.V)$ (4)

wherein $C_1$–$C_4$: proportional constant

D: dot density

V: peripheral speed of the drum

N: number of polygonal mirror faces

F: focal distance of the $f\theta$ lens $P_0$: output of the laser diode

The beam diameter (d) is determined from Equation (1) based on the dot density (D). In the optical unit 20, the beam diameter (d), for example, can be varied by using a different beam expander or prism or varying the focal distance of the collimator lens 26.

According to the present embodiment, the dot density (D) is variable by changing the optical unit 20. Accordingly, different optical units 20 with different dot densities are prepared, such that when it is assumed that the peripheral speed V of the photosensitve drum is constant, all or one of the rotational speed (R) of the polygonal mirror, the number (N) of the polygonal mirror faces, the modulation frequency (f) and the focal distance (F) of the $f\theta$ lens in each optical unit 20 is altered in accordance with the dot density thereof.

When the number of polygonal mirror faces, (N), is given, the number of revolutions (R) of the polygonal mirror is determined from Equation (2) according to the dot density (d). If the modulation frequency (f) is constant, Equation (3) gives the focal distance (F) of the $f\theta$ lens. Equation (4) reveals that at varying dot densities (D), the amount of light on the drum can be made constant by varying the laser output ($P_0$).

On the other hand, Equation (3) indicates that when the modulation frequency (f) and the $f\theta$ lens focal distance (f) are constant, the dot density (D) can be varied by altering the number of polygonal mirror faces, (N).

However, to obtain varying focal distances (F) or varying numbers of polygonal mirror faces, it is necessary to prepare a plurality of $f\theta$ lenses 29 or polygonal mirrors 27 in accordance with the dot densities of different optical units, at a greatly increased cost.

Equations (2) and (3) show that the dot density (D) is readily variable by altering the number of revolutions (R) of the polygonal mirror and the modulation frequency (f) when the $f\theta$ lens focal distance (F) and the polygonal mirror face number (N) remain constant. Equation (2) indicates that the polygonal mirror speed (R) is proportional to the dot density (D). Equation (3) shows that the modulation frequency (f) is in proportion to the square of the dot density (D).

The above description reveals that when optical units 20 with different dot densities are prepared, one of a plurality of different dot densities is selectively available simply changing the optical unit cartridge.

For the different optical units 20 to provide varying dot densities (D), it is practically most feasible to vary the number of revolutions (R) of the polygonal mirror and the modulation frequency (f) as already described. With the present embodiment, the optical unit 20 includes an oscillation circuit 40 which comprises a basic clock circuit (clock signal generating circuit) 40a and a frequency divider circuit 40b for controlling the number of revolutions (R) of the polygonal mirror 27 and the modulation frequency (f) of the laser diode 25.

Figure 4:
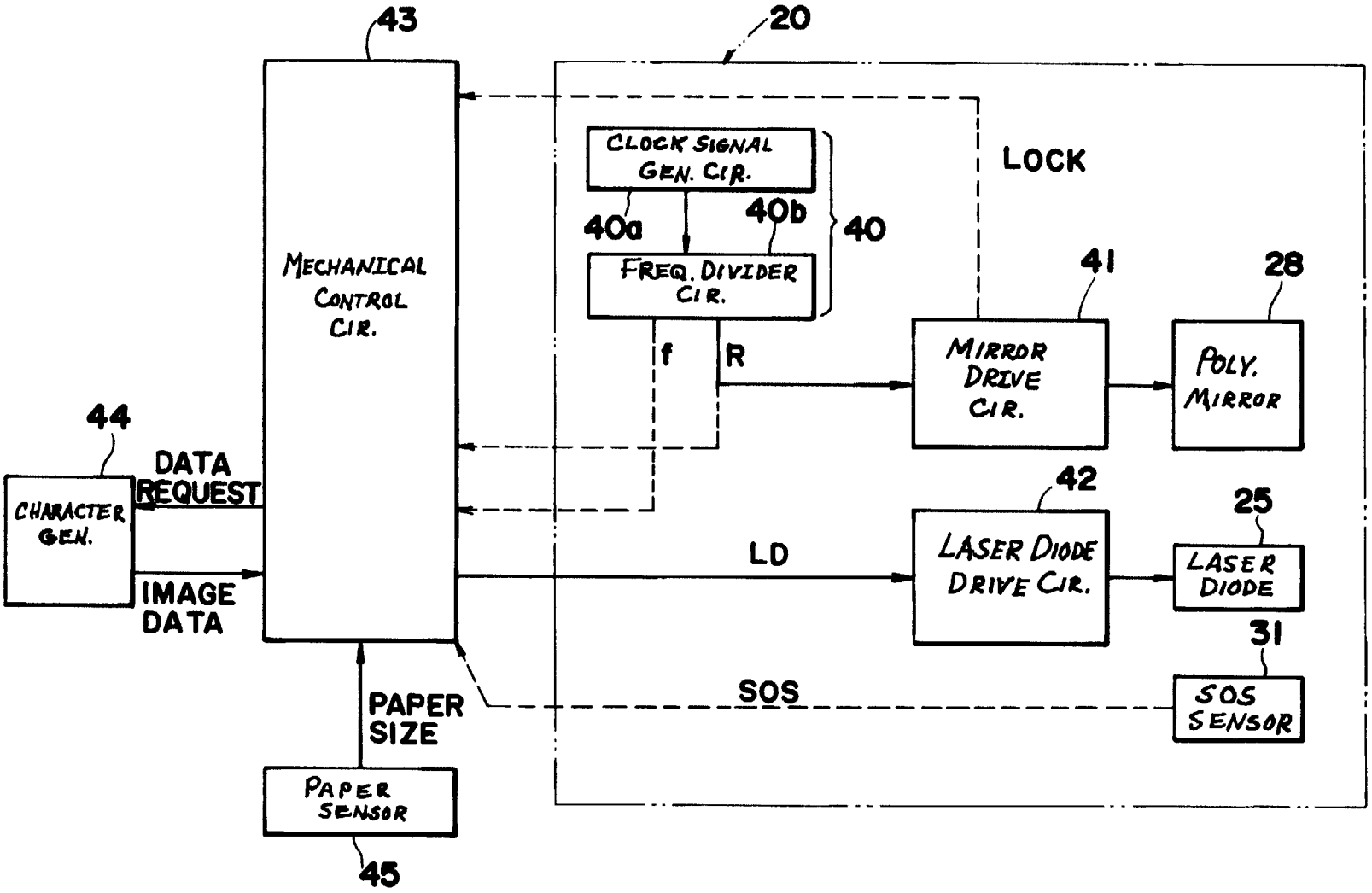
FIG. 4 is a block diagram showing how the first embodiment is controlled.

More specifically stated with reference to FIG. 4, the oscillation circuit 40 feeds frequency data to a polygonal mirror drive circuit 41 within the optical unit 20 to drive the polygonal mirror motor 28 at a speed (R) predetermined for the particular unit 20 concerned. Further the oscillation circuit 40 feeds modulation frequency date (f) to image control means of a mechanical control circuit 43 provided int he system main body and including a microcomputer. In the image control means, the data is combined with image data from a character generator 44 to give LD data (pulse width and pulse on-off data), which is fed to the laser diode drive circuit 42, causing the laser diode 25 to emit a laser beam on modulation.

On the other hand, the other signals to be given by the optical unit 20 to the mechanical control circuit 43 in the main body include a lock signal which is delivered from the drive circuit 41 when the speed of the polygonal mirror 27 has reach the predetermined value. and an SOS (synchronizing) signal which is produced from the SOS sensor 3 for determining the scanning start position. Also fed to the mechanical control circuit 43 is a paper size signal which is produced from a paper sensor 45 provided on the paper cassette 10 shown in FIGS. 1 and 2 for determining the image area.

The basic clock circuit 40a may alternatively be provided in the mechanical control circuit 43 in the main body. Also usable as the beam scanning means in place of the polygonal mirror 27 are a galvanomirror, holographic scanner, etc.

As already stated, the dot density (D) is variable by altering not only the polygonal mirror speed (R) but also the polygonal mirror face number (N). In other words, the desired dot density (D) can be obtained at a lower mirror speed (R) using a polygonal mirror having an increased number (N) of faces. Then a fall bearing is used, the mirror speed (R) is limited to about 10,000 r.p.m., and the permissible range is exceeded when the dot density (D) is higher than a certain level. In such a case, the speed (R) can be set within the permissible range of up to 10,000 r.p.m. by increasing the face number (N).

As shown in FIG. 4, the optical unit 20 feeds the modulation frequency data (f) and the polygonal mirror rotation frequency data (R) to the mechanical control circuit 43 in the main body, and the dot density (D) of the optical unit 20 is transmitted to the main body in terms of these two items of data. Other dot density (D) indicating signals may alternatively be used. The dot density thus transmitted to the system main body serves to indicate the image area, in other words, the dot number for the specified paper size and the dot number from the scanning start point to the end point. The dot density indicating signal may be delivered via the mechanical control circuit 43 to the character generator 44 so as to produce a pattern in accordance with the dot density.

Although the present embodiment has been described above based on the assumption that the dot density in the main scanning direction is identical with that in the subscanning direction, at least one of these do densities can be variable independently. Equations (1) to (3) can be interpreted as follows when the dot density (DM) in the main scanning direction and the dot density (DS) in the subscanning direction are considered separately.

Beam diameter in main scanning direction (dM):

$$dM = C_5/DM \quad (5)$$

Beam diameter in subscanning direction (dS):

$$dS = C_6/DS \quad (6)$$

Number of revolutions (R) of polygonal mirror:

$$R = C_7.DS.V/N \quad (7)$$

Modulation frequency (f):

$$f = C_8.F.DM.DS.V/N = C_9.F.DM.R \quad (8)$$

where $C_5$–$C_9$ are proportional constants.

The beam diameters (dM), (dS) in the main and subscanning directions are determined form Equations (5), (6) based on the dot densities (DM), (DS) in the main and subscanning directions, respectively. When the two beam diameters (dM), (dS) are different, the laser beam is elliptical in cross section.

Equation (7) shows that the dot density (DS) in the subscanning direction is dependent on the polygonal mirror speed (R) and the polygonal mirror face number (N). It is herein assumed that the peripheral speed of the photosensitive drum is constant as in the foregoing case. Accordingly, the dot density (DS) in the subscanning direction is variable by altering the mirror speed (R) and/or the mirror face number (N).

On the other hand, Equation (8) indicates that the dot density (DM) in the main scanning direction is dependent on the modulation frequency (f), the fθ lens focal distance (F) and the polygonal mirror face number (N). Accordingly, if the dot density (DS) in the subscanning direction is varied by altering the mirror speed (R), the dot density (DM) in the main scanning direction also will consequently be varied. The dot density (DS) can only be varied while keeping the other density (DM) at the specified value without any variation, by altering the modulation frequency (f) and/or the fθ lens focal distance (F). For example, the dot density (DS) in the subscanning direction only can be doubled by doubling the mirror speed (R) and also doubling the modulation frequency (f). The dot density (DM) in the main scanning direction then remains unchanged as will be apparent from Equation (8).

Conversely, the dot density (DM) in the main scanning direction only can be varied, for example, by altering the modulation frequency (f) only. In this case, the dot density (DS) in the subscanning direction remains unchanged.

It will be apparent from the above description that the dot densities (DM), (DS) in the main scanning and subscanning directions are also both variable independently of each other.

Figure 5:
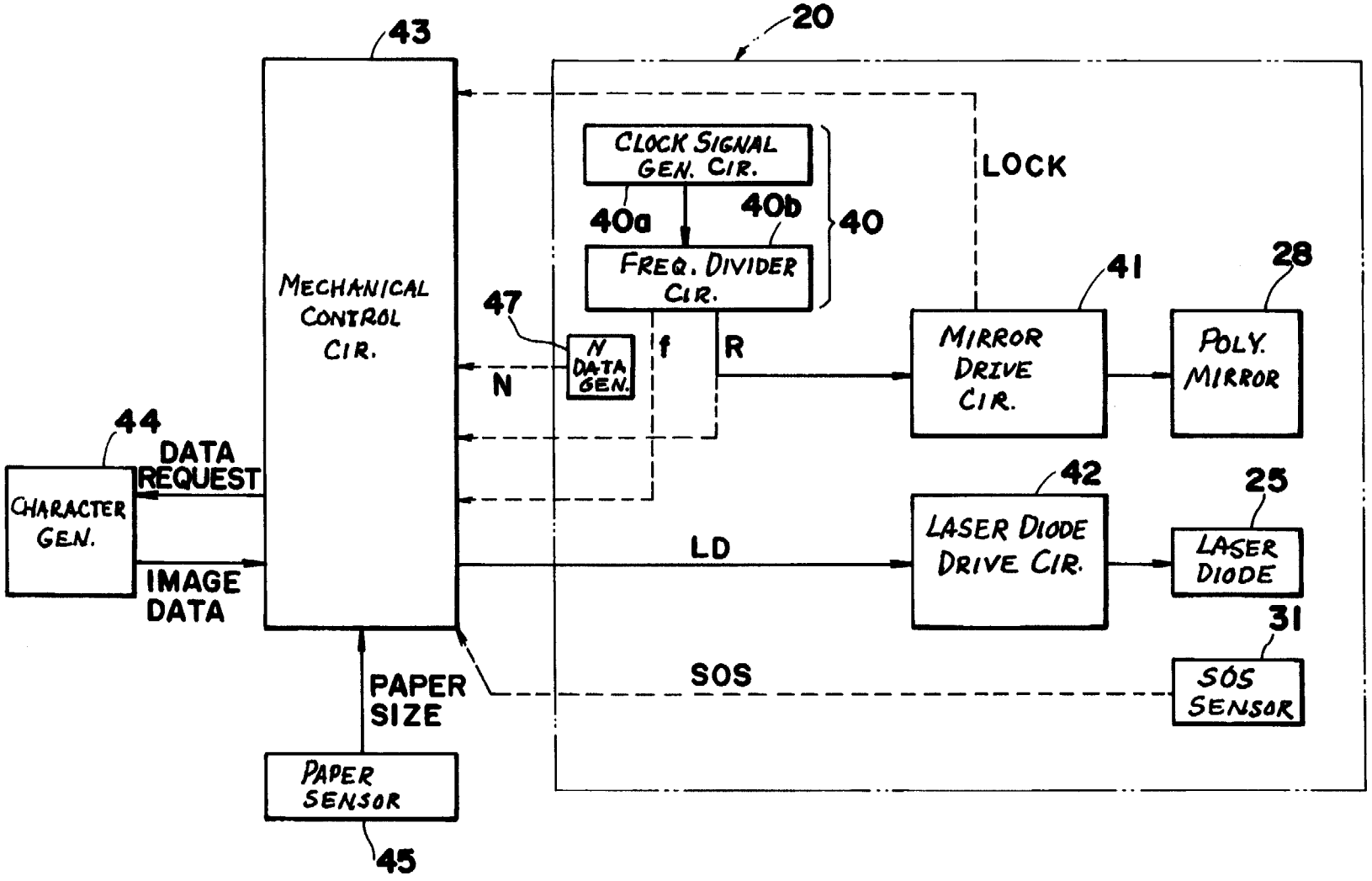
FIG. 5 is a block diagram showing how the form of modified from the first embodiment is controlled.

With reference to FIG. 5, an exemplary circuit construction of optical unit 20 will be described below which is adapted to vary the dot densities (DM), (DS) in the main scanning and subscanning directions independently of each other. Throughout FIGS. 4 and 5, like parts are designated by like reference numbers, and the difference only will be described.

The construction of FIG. 5 comprises, in addition to the construction of FIG. 4, a polygonal mirror face number data generating circuit 47 disposed in the optical unit 20. The circuit 47 gives the mechanical control circuit 43 of the main body the data as to the polygonal mirror face number (N) of the optical unit 20.

The mechanical control circuit 20 recognizes the dot density (DM) in the main scanning direction with reference to the data as to the number of revolutions of the polygonal mirror, (R), and the data as to the laser diode modulation frequency, (f), from the oscillation circuit. The circuit 20 further recognizes the dot density (DS) in the subscanning direction with reference to the polygonal mirror frequency data (f), the mirror face number data (N) and the drum peripheral speed data (V) stored in the circuit 20. In accordance with the two dot densities, the circuit 20 conducts communications with the character generator 44 to prepare the desired LD data.

The dot densities in the main scanning direction and the subscanning direction are controllable independently of each other by the above construction. Data is handled, for example, according to the G3 standard of the facsimile system at densities of 8 pixels/mm in the main scanning direction and 3.85 lines/mm or 7.7 lines/mm in the subscanning direction. When optical units are prepared in conformity with these densities, output images can be produced by the present system for input data without the necessity of image edition. Further when an optical unit is used for main bodies which have a peripheral speed of he photosensitive drum, the main bodies will operate at the same dot density n the main scanning direction but differ in the dot density in the subscanning direction, consequently producing images which are enlarged or contracted in the subscanning direction. Such drawback can be overcome if each main body is equipped with a proper optical unit in conformity with the peripheral speed of its photosensitive drum.

According to the first embodiment described above, cartridges having different dot densities are prepared, one of which is selectively used to obtain the desired one of the dot densities. This enables a single printing system to produce widely varying dot densities. The present system is further easy to maintain because a malfunction, if it occurs, can be remedied by merely replacing the faulty cartrige.

A second embodiment of the invention will be described next.

The second embodiment is adated to form images in more than one color by incorporating a plurality of optical units, as well as a plurality of electrophotographic image forming units, each identical with the corresponding unit of the first embodiment.

Figure 6:
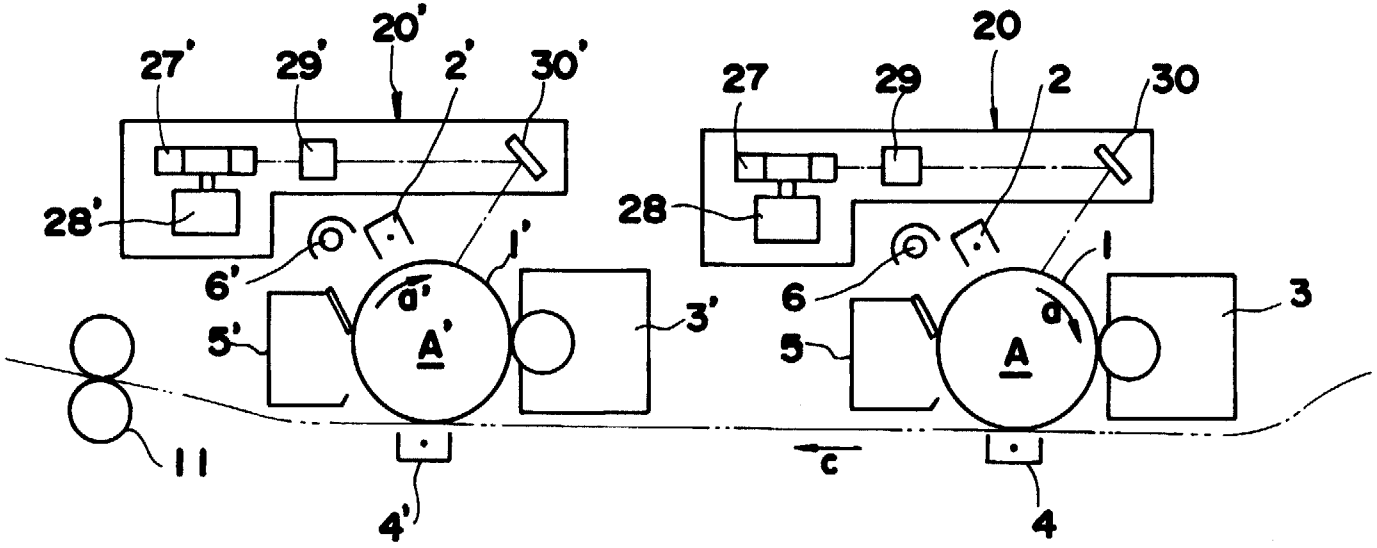
FIG. 6 is a diagram showing the construction of a laser printing system according to a second embodiment of the invention.

FIG. 6 shows the second embodiment wherein electrophotographic units A and A' are arranged in series.

In FIG. 6, the same parts as those of the first embodiment individually in corresponding relation are designated by the same corresponding reference numerals, and a prime is attached to each reference numeral for the second unit A'. Copy paper is transported in the direction of arrow c as indicated by a two-dot-and-dash line. The first photographic unit A transfers an image to the paper, and the second unit A' forms another image as superposed on the first image.

With the second embodiment, optical units 20 and 20' are interchangeable and are each replaceable by an optical unit of different dot density. For example, suppose the first optical unit 20 has a dot density of 200 DPI, the first developing unit 3 contains a black toner, the second optical unit 20' has a dot density of 300 DPI, and the second developing unit 3' contains a red toner. Images of 200 DPI are then formed in black, and those of 300 DPI in red. For example, lines for which high resolution is required can be reproduced in red, and other characters in black, selectively.

If the optical units 20, 20' are interchanged, images of 200 DPI will be formed in red, and those of 300 DPI in black. When another optical unit of a still different dot density (e.g., 400 DPI) is prepared and installed into the system as a replacement, images can be formed in black or red at this dot density.

Figure 7:
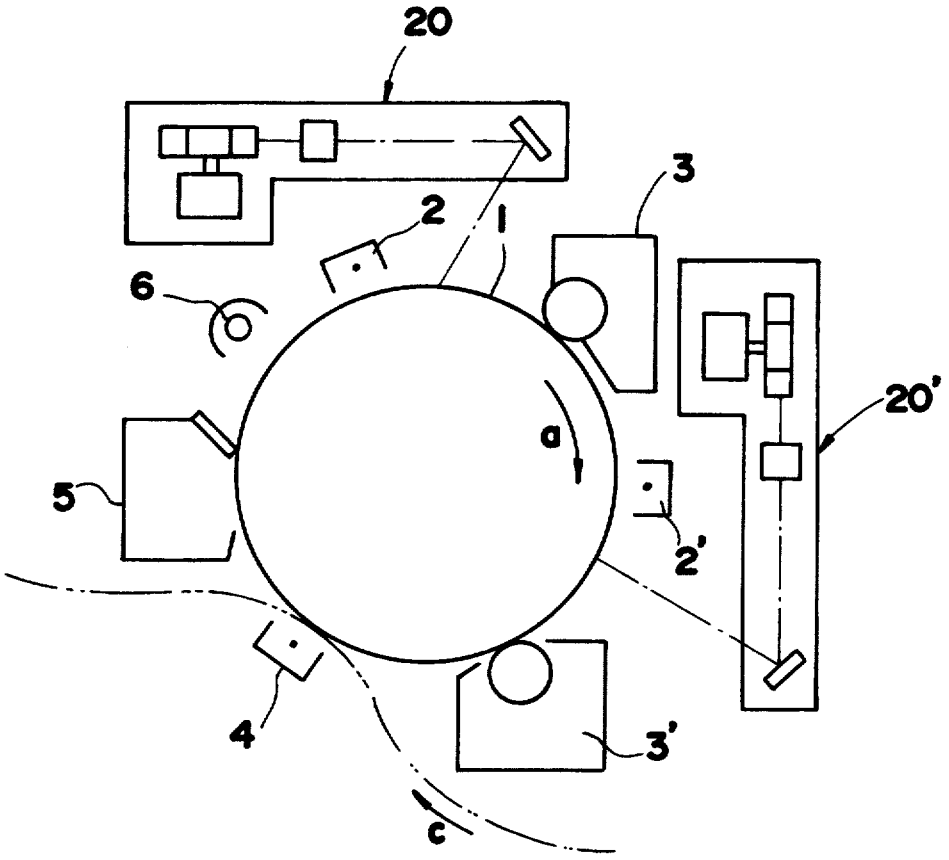
FIG. 7 is a diagram showing the construction of a laser printing system according to a third embodiment of the invention.

FIG. 7 is a diagram showing a third embodiment of the invention.

The third embodiment comprises one photosensitive drum 1 and arranged around the drum 1 are a sensitizing charger 2, an optical unit 20 and a developing units 3 filled with a developer containing a color toner which are arranged in a first stage, and a sensitizing charger 2', an optical unit 20' and a developing unit 3' filled with a developer containing a black toner which are arranged in a second stage. Further arranged around the drum are a transfer charger 4, a cleaner 5 and an eraser lamp 6.

With this embodiment, a first toner image is formed by the optical unit 20 and the developing unit 3, and the optical unit 20' and the developing unit 3' form another toner image superposed on the first image. The combined toner image is then transferred onto copy paper by a single transfer operation with the transfer charger 4.

The optical units 20 and 20' of the third embodiment are the same as those of the second embodiment and therefore will not be described in detail. The third embodiment is equivalent tot he second embodiment in the result achieved.

While the image forming elements for forming two-color images are arranged according to the above second and third embodiments, optical units which are identical or different in dot density may be arranged side by side for one set of image forming elements so as to selectively use one of the optical units. One of the optical units, when used more frequently than the other in this case, can be discarded and replaced by the less frequently used one, and a new optical unit installed in the latter position.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. A laser print system comprising:

a main body including at least one photosensitive member and at least one developing means; and a plurality of optical units, each unit being for producing an optical output for forming an image on the photosensitive member, said units being exchangeably mountable in said body at least one at a time and corresponding to a photosensitive member, each unit comprising:

a laser beam source, means for driving the laser beam source, means for shaping the laser beam, means for scanning the surface of said photosensitive member with the laser beam, said laser beam source and said respective means producing an optical output having a dot density different from the dot density of the optical output of the other units, and means for giving an instruction as to the dot density of said units to said main body;

whereby said main body forms an image at the dot density according to the instruction corresponding to the optical unit from among the plurality of optical units which is mounted in said main body.

2. A laser printing system as claimed in claim 1, wherein said scanning means includes a polygonal mirror for deflecting the laser beam and for scanning the surface of the corresponding photosensitive member with the beam by rotation thereof, and means for rotating said polygonal mirror at a predetermined speed.

3. A laser printing system as claimed in claim 2, wherein the rotational speed of the polygonal mirror in each optical unit is different from the rotational speed of the polygonal mirrors in the other units and in accordance with the dot density of the respective unit.

4. A laser printing system as claimed in claim 3, wherein said means for giving an instruction as to the dot density of said optical unit is a means for providing a signal representing the rotational speed of the polygonal mirror.

5. A laser printing system as claimed in claim 1, wherein the modulation frequency of the laser beam in each optical unit is different form the modulation frequencies of the laser beams in the other units and in accordance with the dot density of the respective unit.

6. A laser printing system as claimed in claim 5, wherein said means for giving an instruction as to the dot density of said optical unit is a means for providing a signal representing the modulation frequency of the laser beam, and said main body includes means for outputting image data which is modulated at the modulation frequency of said means for driving the laser beam source.

7. A laser printing system as claimed in claim 1, wherein said optical units are exchangeably mounted in said main body at least two at a time.

8. A laser printing system as claimed in claim 1, wherein said main body has a plurality of developing devices, and there is a plurality of optical units, one for each developing device, and each developing device is filled with a developer containing a toner having a color different from the color of the toner in the other developing devices.

9. A laser printing system as claimed in claim 8, wherein said main body has a plurality of photosensitive members and there is a plurality of said optical units, one corresponding to each photosensitive member.

10. A laser printing system as claimed in claim 8, wherein said main body has a single photosensitive member and a plurality of developing devices, and there is a plurality of optical units, one corresponding to each developing unit.

11. An optical unit for a laser printing system which forms an image on a photosensitive member by laser beam scanning, said optical unit comprising:

a laser beam source;

means for driving the laser beam source;

means for shaping the laser beam;

means for scanning the surface of a photosensitive member with the laser beam, said laser beam source and said respective means producing an optical output having a dot density unique to said optical unit;

means for giving to the laser printing system an instruction as to the dot density of the optical output of the unit; and a case which is removably mountable in said laser printing system and containing said laser beam source, said means for driving the laser beam source, said means for shaping the laser beam, said means for scanning with the laser beam and said means for giving an instruction.

12. An optical unit as claimed in claim 11, wherein said scanning means includes a polygonal mirror for deflecting the laser beam and for scanning the surface of the corresponding photosensitive member with the beam by rotation thereof, and means for rotating said polygonal mirror at a predetermined speed.

13. An optical unit as claimed in claim 12, wherein the rotational speed of the polygonal mirror is in accordance with the dot density of the optical output thereof.

14. An optical unit as claimed in claim 13, wherein said means for giving an instruction as to the dot density of said optical unit is a means for providing a signal representing the rotational speed of the polygonal mirror.

15. An optical unit as claimed in claim 12, wherein the modulation frequency of the laser beam is in accordance with the dot density of the optical output thereof.

16. An optical unit as claimed in claim 15, wherein said means for giving an instruction as to the dot density of said optical unit is a means for providing a signal representing the modulation frequency of the laser beam, and said main body includes means for outputting image data which is modulated at the modulation frequency of said means for driving the laser beam source.

*17. An electrophotographic printer, comprising:*

*photosensitive means having a surface to be charged;*

*means for electrically charging the surface of said photosensitive means;*

*means for scanning a light spot on said photosensitive means to form electrostatically a latent image of electric data thereon, said means for scanning including at least two optical units each scanning a light spot on said photosensitive means and different in dot density from each other;*

*means for developing the latent image into a toner image;* means for transferring the tone image onto a copy sheet; and

*means for thermally fixing the toner image on the copy sheet.*

*18. An electrophotographic printer, comprising:*

*photosensitive means having a surface to be charged;*

*means for electrically charging the surface of said photosensitive means;*

*means for scanning a light spot on said photosensitive means to form electrostatically a latent image of electric data thereon, said means for scanning including at least two exchangeably mounted optical units each scanning a light spot on said photosensitive means and different in dot density form each other;*

*means for developing the latent image into a toner image;*

*means for transferring the toner image onto a copy sheet; and*

*means for thermally fixing the toner image on the copy sheet.*

*19. An electrophotographic printer, comprising:*

*photosensitive means having a surface to be charged;*

*means for electrically charging the surface of said photosensitve means;*

*means for scanning a light spot on said photosensitive means to form electrostatically a latent image of electric data thereon, said means for scanning including at least two detachably provided optical units each scanning a light spot on said photosensitive means and different in dot density from each other;*

*means for developing the latent image into a toner image;*

*means for transferring the toner image onto a copy sheet; and*

*means for thermally fixing the toner image on the copy sheet.*

* * * * *